(12) United States Patent
Dyson et al.

(10) Patent No.: US 6,349,738 B2
(45) Date of Patent: Feb. 26, 2002

(54) APPARATUS FOR SEPARATING PARTICLES FROM A FLUID FLOW AND A VALVE FOR INTRODUCING BLED FLUID TO A MAINSTREAM FLUID

(75) Inventors: James Dyson, Wiltshire; Geoffrey Michael Burlington, Crowborough; James Wilson Braithwaite, Bath, all of (GB)

(73) Assignee: Notetry Limited, Wilshire (GB)

( * ) Notice: Subject to any disclaimer, the term of this patent is extended or adjusted under 35 U.S.C. 154(b) by 0 days.

(21) Appl. No.: 09/795,315

(22) Filed: Mar. 1, 2001

Related U.S. Application Data (62) Division of application No. 09/214,732, filed as application No. PCT/GB97/01802 on Jul. 3, 1997, now Pat. No. 6,231,649.

(30) Foreign Application Priority Data

Jul. 15, 1996 (GB) ............................................. 9614827

(51) Int. Cl.⁷ ............................ F16K 24/06; A47L 9/16; G05D 7/01
(52) U.S. Cl. ........................................ 137/114; 137/907
(58) Field of Search .............................. 137/87.04, 114, 137/115.01, 115.03, 115.13, 505, 526, 543, 554, 556, 907; 55/310, DIG. 3, DIG. 34; 15/353; 96/418

(56) References Cited

U.S. PATENT DOCUMENTS

| | | | |
|---|---|---|---|
| 1,038,685 A | * 9/1912 | Titus | ........................ 137/526 |
| 2,443,162 A | 6/1948 | Hallock | |
| 3,849,020 A | * 11/1974 | Eastman | ........................ 415/28 |
| 4,571,772 A | 2/1986 | Dyson | |
| 4,593,429 A | 6/1986 | Dyson | |
| 4,643,748 A | 2/1987 | Dyson | |
| 4,826,515 A | 5/1989 | Dyson | |
| 4,853,008 A | 8/1989 | Dyson | |
| 4,853,011 A | 8/1989 | Dyson | |
| 4,889,037 A | 12/1989 | Goral et al. | |
| 5,062,870 A | 11/1991 | Dyson | |
| 5,078,791 A | 1/1992 | Dyson | |
| 5,090,976 A | 2/1992 | Dyson | |
| 5,145,499 A | 9/1992 | Dyson | |
| 5,160,356 A | 11/1992 | Dyson | |
| 5,351,709 A | * 10/1994 | Vos | ........................ 137/907 |
| 5,477,673 A | * 12/1995 | Blais et al. | ............... 60/39.07 |
| 5,558,697 A | 9/1996 | Dyson et al. | |
| 5,951,746 A | 9/1999 | Treitz et al. | |
| 6,093,226 A | 7/2000 | Schoenberger | |

FOREIGN PATENT DOCUMENTS

| | | |
|---|---|---|
| GB | 1080504 | 8/1967 |
| WO | 94/00046 | 1/1994 |

* cited by examiner

*Primary Examiner*—John Rivell
*Assistant Examiner*—Ramesh Krishnamurthy
(74) *Attorney, Agent, or Firm*—Morrison & Foerster LLP (57) ABSTRACT

A bleed valve for introducing bled fluid to a mainstream fluid flowing through apparatus across which a pressure differential occurs, characterized in that the bleed valve is adapted to open so as to bleed fluid into the mainstream fluid when the pressure differential across the apparatus falls below a predetermined value. This arrangement is particularly appropriate to vacuum cleaners incorporating cyclonic dust-separating apparatus in that the bleed valve is more reliably operated in response to a reduction in airflow. This ensures efficient functioning of the cyclonic dust-separating apparatus and reduces the risk of overheating of the motor.

11 Claims, 7 Drawing Sheets

APPARATUS FOR SEPARATING PARTICLES FROM A FLUID FLOW AND A VALVE FOR INTRODUCING BLED FLUID TO A MAINSTREAM FLUID

This application is a division of U.S. patent application Ser. No. 09/214,732, filed Jun. 11, 1999, now U.S. Pat, No, 6,231,649, which is a 371 of PCT/GB97/01802 filed Jul. 3, 1997.

FIELD OF THE INVENTION

The invention relates to apparatus for separating particles from a fluid flow particularly, but not exclusively, to apparatus for separating dust from an airflow in a vacuum cleaner. The invention also relates to a valve for introducing bled fluid to a mainstream fluid.

BACKGROUND OF THE INVENTION

Separation apparatus incorporating at least one bleed valve is known, for example from published International patent application Ser. No. PCT/GB93/01325. In that arrangement, a bleed valve is arranged upstream of a cyclonic separator such that, if the pressure (which is normally directly related to the airflow) in the separator falls below a predetermined level, air is bled into the airflow path from the atmosphere in order to maintain a minimum airflow. This allows the cyclonic separator to operate satisfactorily and ensures that the motor is effectively cooled. Whilst this known arrangement is perfectly adequate in most cases, it has been found that there are some instances when its performance could be improved. For example, a vacuum cleaner will normally include a filter, separate from the main dust-separating apparatus, located either immediately upstream or downstream of the motor. If this filter becomes clogged, the airflow through the dust-separating apparatus (i.e. the cyclonic separator) will be reduced and this can prevent sufficient suction being developed in the dust-separating apparatus to cause the bleed valve to bleed air into the dust-separating apparatus. The result can be reduced effectiveness or efficiency of the cyclonic separator and, more importantly, an increased risk of the motor overheating.

It is also known from UK patent No. 1080504 to provide a signal device for a vacuum cleaner which operates in response to an increase in pressure differential across the bag or filter to indicate that the filter requires changing. The signal is given by bleeding air along a conduit and across a reed to give an audible indication that the filter should be changed.

It is an object of the present invention to provide a bleed valve which is not dependent upon absolute pressures in order to operate.

It is also an object of the present invention to provide improved apparatus for separating particles from a fluid flow, particularly suitable for use in a vacuum cleaner, which is capable of reliably bleeding air into the separation apparatus so as to maintain a minimum airflow therein and to reduce the risk of the motor overheating.

A further object of the invention is to provide improved apparatus for separating particles from a fluid flow, particularly suitable for use in a vacuum cleaner, which can be utilised to indicate that a blockage is present.

BRIEF SUMMARY OF THE INVENTION

The invention provides a bleed valve. The invention also provides an apparatus containing a bleed valve.

The present invention further provides a valve for introducing a fluid between an inlet and outlet of an apparatus, which comprises: a valve head which is movable between an open and a closed position to open and close a first opening into the valve; a housing means having: (i) a first section, defining the first opening leading to a first chamber on one side of a flexible seal means mounted between the housing means and the valve head of the piston means to be connected by a second opening in the first section upstream of flow of the fluid in the apparatus; (ii) a second section defining a second chamber on an opposite side of the seal means and between the piston means and the second section, with a third opening in the second section to be connected downstream of a fluid flow in the apparatus; and bias means mounted so as to hold the piston means with the valve head in the open position at rest and wherein when a first flow of fluid through the apparatus includes a pressure in the second section less than the pressure in the first section, the valve head is in the closed position in the opening and the fluid is prevented from flowing through the opening in the valve and wherein when a blockage of fluid flow occurs between the inlet and the outlet of the apparatus the valve is in the open position while the fluid is flowing to admit fluid into the valve and apparatus.

The present invention also provides an apparatus having a fluid air flow between an inlet and an outlet through an element which produces a pressure drop and which is subject to becoming blocked, by means of a valve which allows fluid to be introduced between the inlet and the outlet, the improvement wherein the valve comprises a valve head which is movable between an open and a closed position to open and close a first opening into the valve in response; a housing means having: (i) a first section, defining the first opening leading to a first chamber on one side of a flexible seal means mounted between the housing means and the valve head of the piston means connected by a second opening in the first section upstream of flow of fluid in the apparatus; (ii) a second section defining a second chamber on an opposite side of the seal means and between the piston means and the second section, with a third opening in the second section connected downstream of a fluid flow in the apparatus; and bias means mounted so as to hold the piston means with the valve head in the open position at rest and wherein when a first flow of fluid through the apparatus includes a pressure in the second section less than the pressure in the first section, the valve head is in the closed position in the opening and the fluid is prevented from flowing through the opening in the valve and wherein when a blockage of fluid flow occurs between the inlet and the outlet of the apparatus, the valve is in the open position while the fluid is flowing to admit fluid into the valve and apparatus.

The provision of a bleed valve which is responsive to a drop in the pressure differential measured across the separation apparatus means that ambient fluid is bled more reliably into the flow path. This is because the pressure drop across the separation apparatus, particularly cyclonic separation apparatus, is directly related to the flow rate. The pressure losses are due primarily to friction which is highly dependent upon the flow rate. The higher the flow rate, the greater the pressure drop across the cyclonic separation apparatus.

It is important to maintain an adequate flow rate through separation apparatus, particularly cyclonic separation apparatus, if good separation is to be maintained. It is also very important to maintain an adequate flow of cooling air or other fluid past a motor in order to avoid overheating. The present invention therefore represents a significant improvement over the prior art.

Since a drop in the pressure differential (i.e. flow rate) across the separation apparatus is indicative of a blockage in the flow path, the operation of the bleed valve can also be used to indicate that a blockage is present and provide a signal to the user that maintenance is required. In the prior art arrangements, a blockage located between the separation apparatus and the fan or motor can fail to cause the bleed valve to operate.

A further advantage of the present invention is that the bleed valve will normally be open when the motor is switched off. In the prior art arrangement, the bleed valve would be shut and may not open if a blockage is present at the time the motor is switched on. In the apparatus according to the invention, the bleed valve stays open until a sufficient pressure drop is achieved across the dust-separating apparatus. This ensures that the motor is adequately cooled at all times.

BRIEF DESCRIPTION OF THE DRAWINGS

Embodiments of the invention will now be described with reference to the accompanying drawings wherein.

DETAILED DESCRIPTION OF THE INVENTION

Figure 1:
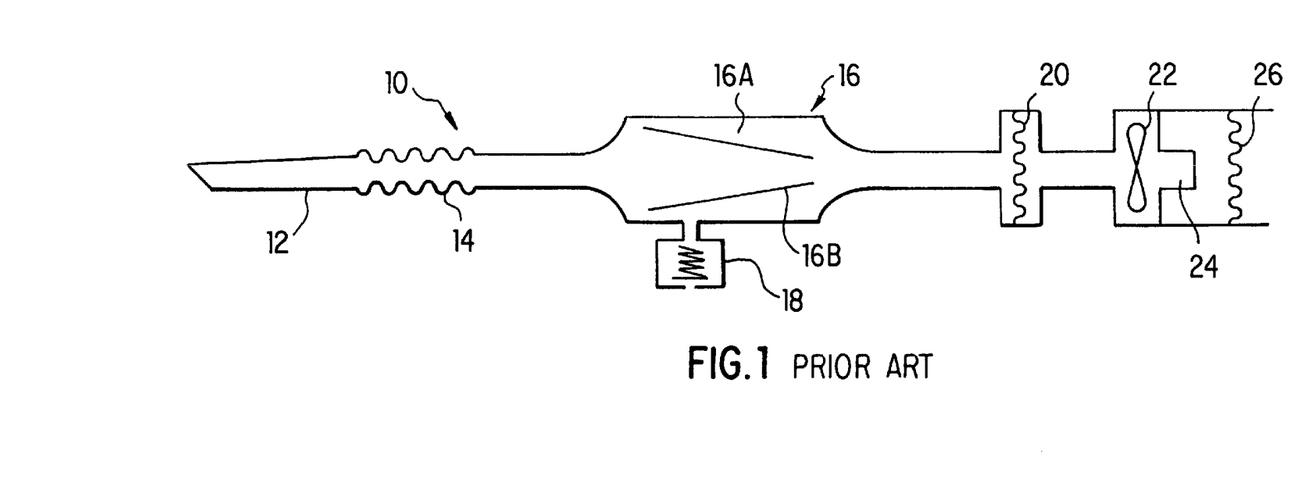
FIGS. 1 and 1A are schematic illustrations of cyclonic vacuum cleaners according to the prior art mentioned in the introduction hereto.
Figure 1A:
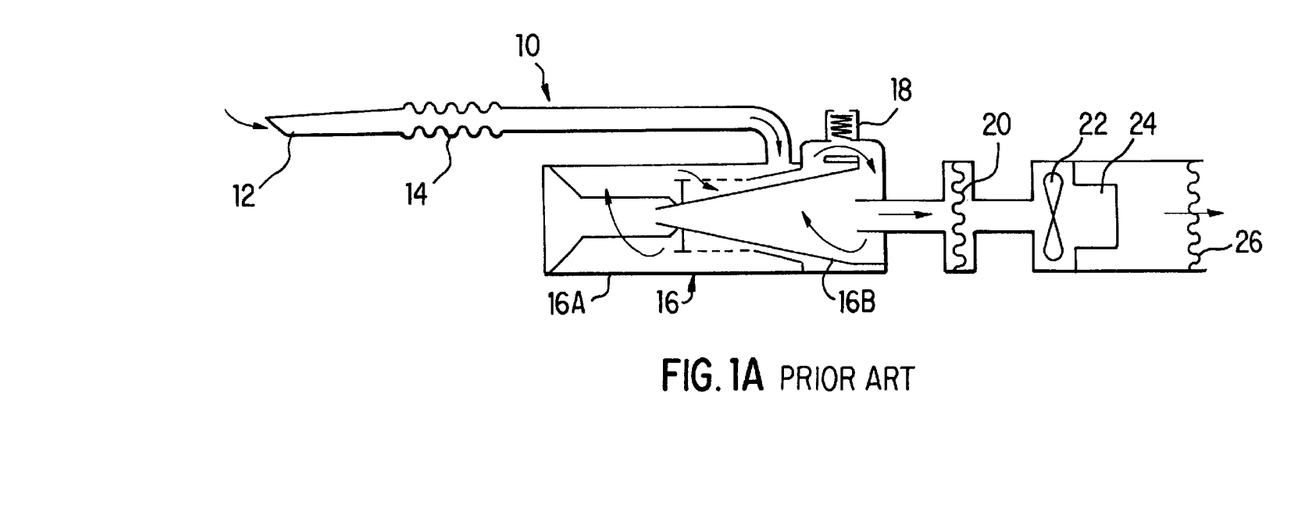

FIGS. 1 and 1A are schematic illustrations of known vacuum cleaners. In each case, the vacuum cleaner 10 incorporates a nozzle 12 attached directly to a hose 14 and the hose 14 is directly connected to dust-separating apparatus 16. The dust-separating apparatus 16 can be any conventional dust-separating apparatus, such as a bag filter, but in this case comprises cyclonic separating apparatus consisting of two cyclones 16A, 16B arranged in series. The arrangement, dimensions and operation of such dust-separating apparatus 16 are well documented elsewhere and will not be described any further here, other than to mention that a bleed valve 18 is located in the airflow path either upstream of the cyclones 16A, 16B (FIG. 1) or between the two cyclones 16A,16B (FIG. 1A). Downstream of the dust-separating apparatus 16 is a pre-motor filter 20, followed by a fan 22, a motor 24 and a post-motor filter 26, seen in the direction of airflow. The operation of cyclonic separating apparatus of this type is described in U.S. Pat. Nos. 4,571,772; 4,593,429; 4,643,748; 4,826,515; 4,853,008; 4,853,011; 5,062,870; 5,078,761; 5,090,976; 5,145,499 and 5,160,356 but does not form part of the present invention.

In use, the motor 24 operates to activate the fan 22 which causes a flow of air to pass from the nozzle 12 to the dust-separating apparatus 16 via the hose 14. After separation has taken place, the airflow passes through the pre-motor filter 20, past the fan 22, past the motor 24 providing a cooling effect, and through the post-motor filter 26 before being expelled to the atmosphere. The bleed valve 18 is arranged such that, if the pressure within the dust-separating apparatus 16, and particularly at the location within the dust-separating apparatus 16 at which the bleed valve 18 is placed, drops below a pre-determined value, the bleed valve 18 opens so as to allow air from the atmosphere to enter the cyclonic dust-separating apparatus in order to maintain an adequate airflow to effect separation. The prevention of the airflow from falling below a predetermined level also ensures that the motor 24 is adequately cooled so as to prevent any risk of overheating.

If either of the filters 20,26 becomes sufficiently clogged to cause a reduction in the airflow within the vacuum cleaner 10, the airflow through the dust-separating apparatus 16 is reduced. However, because the blockage is located downstream of the dust-separating apparatus, the flow rate in the dust-separating apparatus 16 is reduced but the pressure drop across the apparatus 16 is small. All the pressure drop occurs across the blocked filter. This prevents the bleed valve 18 from operating. In these circumstances, the prior art bleed valve 18 does not provide adequate protection against overheating of the motor 24.

Figure 2:
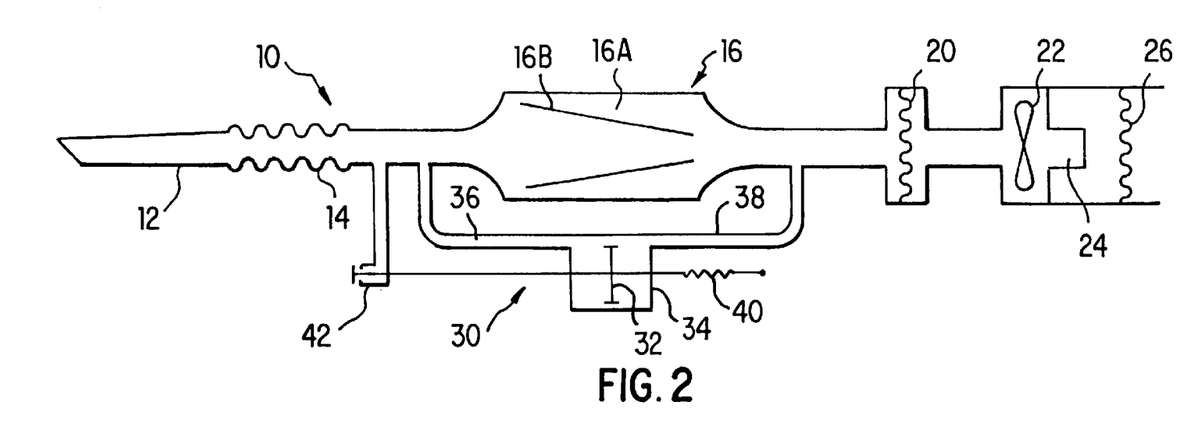
FIG. 2 and 2A are schematic illustrations similar to FIGS. 1 and 1A illustrating the invention.
Figure 2A:
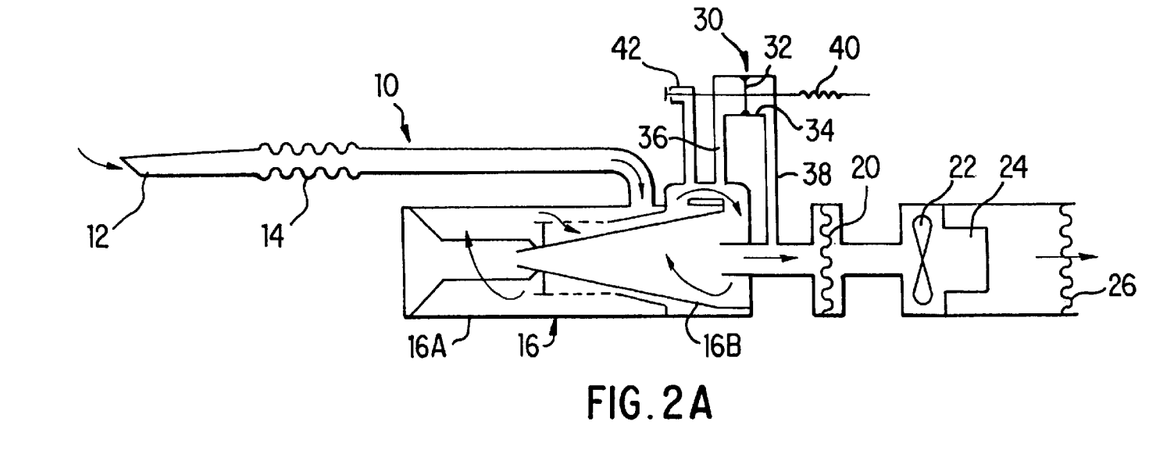

FIGS. 2 and 2A illustrate the same type of vacuum cleaner as illustrated in FIGS. 1 and 1A but with the bleed valve 18 replaced by a bleed valve 30 in accordance with the invention. All other parts of the schematically illustrated cleaners are provided with reference numerals identical to those shown in FIGS. 1 and 1A.

The bleed valve 30 consists essentially of a piston 32 housed within a chamber 34. A first side of the piston 32 is connected via a line 36 to a point in the airflow path immediately upstream of the entire dust-separating apparatus 16 (FIG. 2) or alternatively to a point in the airflow path immediately upstream of the downstream cyclone 16B (FIG. 2A). The other side of the piston 32 is directly connected via line 38 to a point in the airflow path immediately downstream of the dust-separating apparatus 16. Thus, any pressure differential existing across the entire dust-separating apparatus 16 (FIG. 2) or across the downstream cyclone 1 6B (FIG. 2A) is applied directly across the piston 32.

Resilient biasing means 40 are applied to the piston 32 so that, when a predetermined pressure differential is applied across the piston 32, the piston 32 is in fact in equilibrium. When the pressure differential drops below the predetermined value, the piston 32 moves under the action of the biasing means 40 so as to open a vent 42 which, when open, will allow atmospheric air to enter the airflow path of the vacuum cleaner 10 at a point upstream of the dust-separating apparatus 16. The introduction of this bled air has the same effect as the air bled into the airflow path by the bleed valve 18 shown in FIGS. 1 and lA but is dependent upon the pressure differential across the dust-separating apparatus 16 or the downstream cyclone 16B rather than upon the absolute pressure therein.

Figure 3:
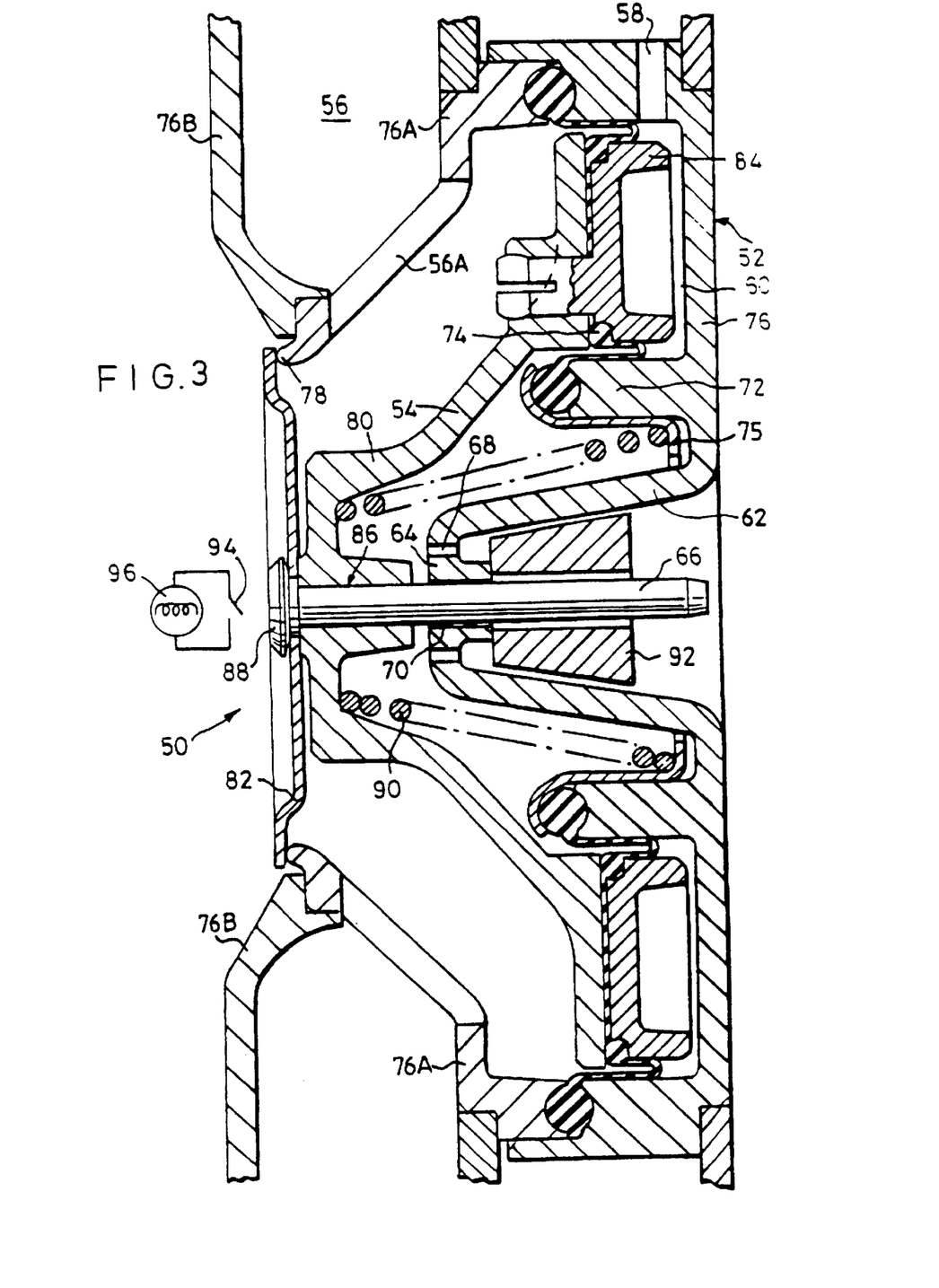
FIG. 3 is an enlarged front cross-sectional view of an embodiment of the bleed valve forming part of the vacuum cleaner illustrated schematically in FIGS. 2 and 2A.
Figure 3A:
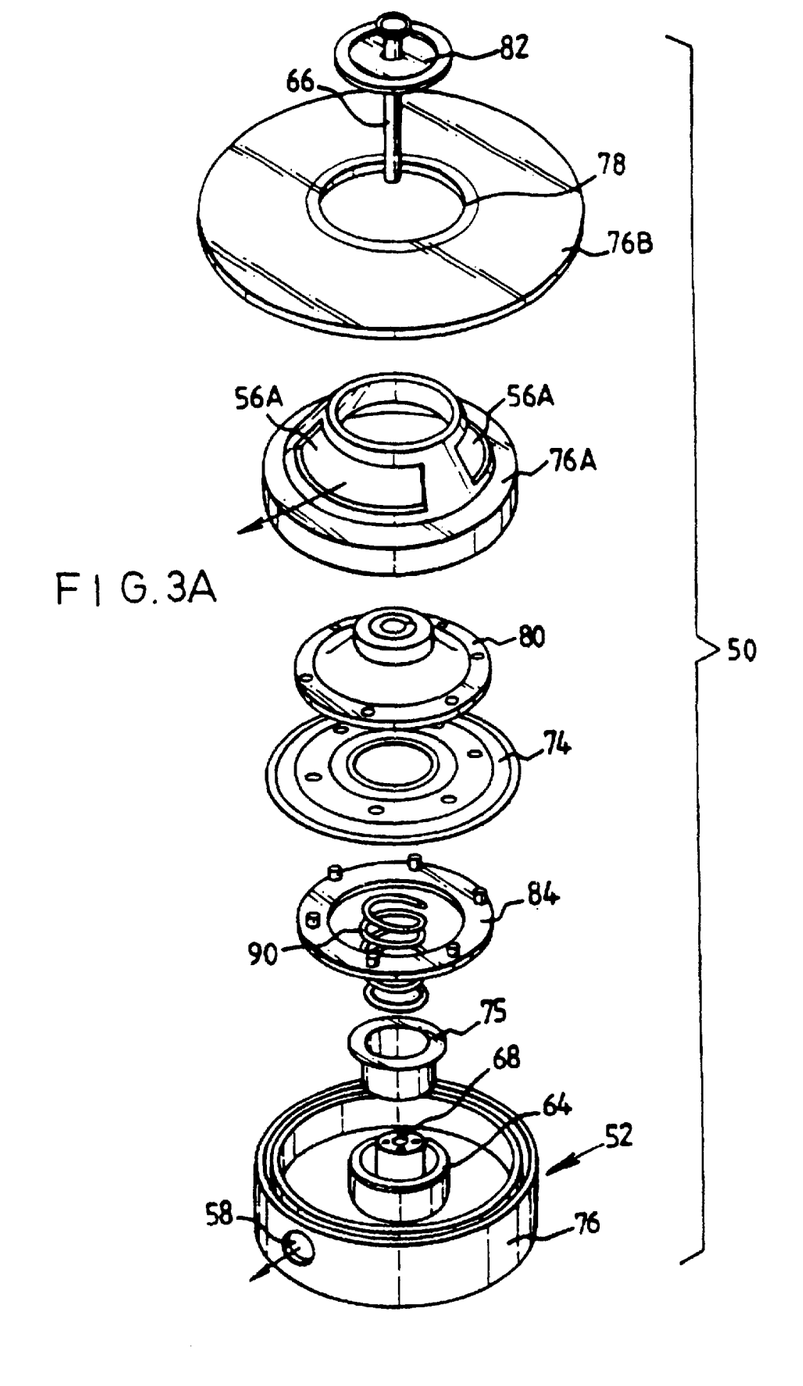
FIG. 3A is an exploded perspective view of the bleed valve shown in FIG. 3.

FIGS. 3 and 3A illustrate a bleed valve 50 suitable for use in the arrangements illustrated in FIGS. 2 and 2A. The bleed valve 50 essentially comprises a housing 52, 76A, 76B and a piston 54. The housing 52 defines two ports 56, 58 to which lines can be connected for suitable connection to the airflow path upstream and downstream respectively of the dust-separating apparatus 16 or the downstream cyclone 16B. The housing 52 also defines a chamber 60 in which the piston 54 is slidably mounted. The housing 52 also comprises a central portion 62 for receiving and supporting the biasing means and a supporting central rod.

More specifically, the housing 52 is generally annular in shape. The central portion 62 is generally cup-shaped and has a central aperture 64 to allow a rod 66 to pass slidingly therethrough. Apertures 68 and/or a central aperture 70 are provided in the central portion 62 in the vicinity of the aperture 64. The function of these apertures 68, 70 will be described later.

Radially outwardly of the central portion 62 is a flange portion 72 designed to receive one end of a diaphragm seal 74, the other end of which will be fixedly attached to the piston 54. The flange 72 also defines part of the chamber 60, the remainder of which is defined by a radially-outwardly extending wall 76 of the housing 52. The outermost edge of the housing 52 is shaped so as to close the chamber 60, to define the port 58 and to receive the other side of the diaphragm seal 74. The port 56 is arranged in the housing 52 displaced in an axial direction with respect to the port 58. The side of the port 56 remote from the port 58 defines an axial, annular aperture 56A which can be closed by the head portion of the piston 54 which will be described later. A flexible seal 78 is located around the periphery of this aperture to facilitate airtight sealing and is held in place by upper wall 76A and cleaner wall 76B.

The piston 54 has a main body 80 and a head portion 82. The main body 80 is generally dish-shaped and the radially-outer portions are shaped so as to slide easily within the chamber 60. Sufficient play is provided between the radially-outer portions 84 and the chamber 60 to allow the rolling diaphragm 74 to operate therebetween. The radially-outer portions of the piston 54 are manufactured in two separate portions in order to allow the diaphragm seal 74 to be securely trapped between the separate portions so as to provide an adequate working seal.

The central portion of the piston 54 has a central aperture 86 for receiving the rod 66. The rod 66 is fixedly retained in the central portion of the piston 54 and a bolt 88 located at the end of the rod 66 is provided to hold the head 82 of the piston 54 on the rod 66. Some play is allowed between the rod 66 and the head 82 in order to allow sufficient leeway to accommodate some misalignment between the rod 66 and the remainder of the bleed valve 50.

A spring 90 is positioned between the housing 52 and piston 54. The spring 90 abuts against the housing 52 between the flange 72 and the central portion 62. The spring 90 also abuts against the central portion of the piston 54 adjacent the aperture 86 for receiving the rod 66. The rod 66 carries a stop 92 on its end remote from the bolt 88. This stop 92 limits the movement of the rod 66 in an axial direction.

The bleed valve 50 described above can have any appropriate dimensions. However, tests have shown that a bleed valve 50 having a head portion 82 with a diameter of around 26 mm and a piston 54 with an outer diameter of around 49 mm operates effectively. Other dimensions will be selectable around these dimensions to suit particular applications and to achieve a compact design. It is preferred that the rod 66 is allowed to move axially by at least 4 mm.

The bleed valve 50 is illustrated in a closed position. The outer edges of the head 82 are pressed against the seal 78 so that the unit as a whole is closed. Port 56 is connected to the airflow path of the vacuum cleaner immediately upstream of the dust-separating apparatus 16 or the downstream cyclone 16B and therefore the upstream pressure acts directly on the surface of the piston 54 which is shown to the left in FIG. 3. The port 58 is connected to the airflow path immediately downstream of the dust-separating apparatus 16 and therefore the downstream pressure acts directly on the downstream side of the piston 54 illustrated on the right in FIG. 3. Atmospheric pressure acts on the left hand side of the bead 82 as illustrated and on the right hand side of the center of the piston 54 by virtue of the fact that the area in which the spring 90 is placed is open to atmosphere by way of the apertures 68, 70.

As long as the pressure differential across the dust-separating apparatus 16 or the downstream cyclone 16B remains sufficiently large, the piston 54 is pressed to the right against the action of the spring 90. However, as soon as the pressure differential drops below a predetermined minimum, the action of the spring 90 takes precedence over the pressure differential acting across the piston 54 and the piston 54 will move to the left. The head 82 therefore also moves to the left and the seal between the head 82 and the seal 78 is broken. Therefore, atmospheric air can enter the bleed valve between the head 82 and the seal 78 and atmospheric air will then pass through the port 56 and enter the airflow path upstream of the dust-separating apparatus 16 or downstream cyclone 16B. The airflow within the cyclones is thereby maintained and sufficient airflow is provided to cool the motor.

As soon as the pressure differential across the dust-separating apparatus 16 or downstream cyclone 16B returns to an acceptable level, the piston 54 will move again to the right and the head 82 will re-seal the opening. Atmospheric air will again be excluded from the airflow passing through the dust-separating apparatus 16. The apertures 68, 70 are provided with dimensions which will ensure that the movement of the piston 54 is naturally damped by the egress of air from the area between the housing and the piston.

A preferred feature of the invention is the provision of indication means operated by the movement of the piston 54 which will warn the user of the apparatus that maintenance is required. This can be easily achieved by providing a switch 94 operable by the movement of the piston 66 for activating a warning light 96 or other signalling means. In order to avoid unnecessary warnings being given, the indication means can be arranged so as to provide a warning only when the bleed valve 50 is operated repeatedly or for a prolonged period. Means for achieving this are well known in the art.

Figure 4:
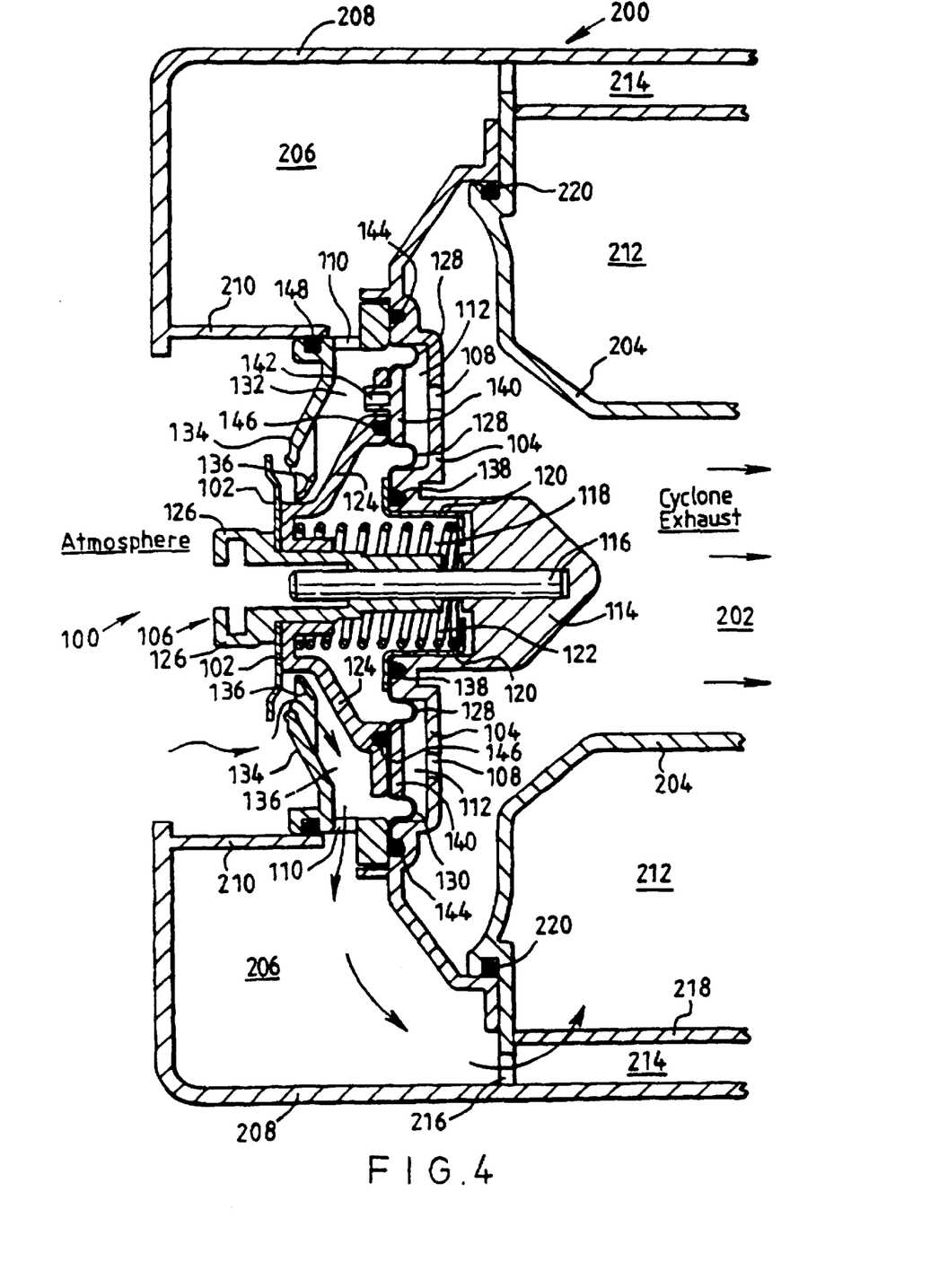
FIG. 4 is a view similar to FIG. 3 of an alternative embodiment of the bleed valve forming part of the vacuum cleaner illustrated schematically in FIGS. 2 and 2A.
Figure 4A:
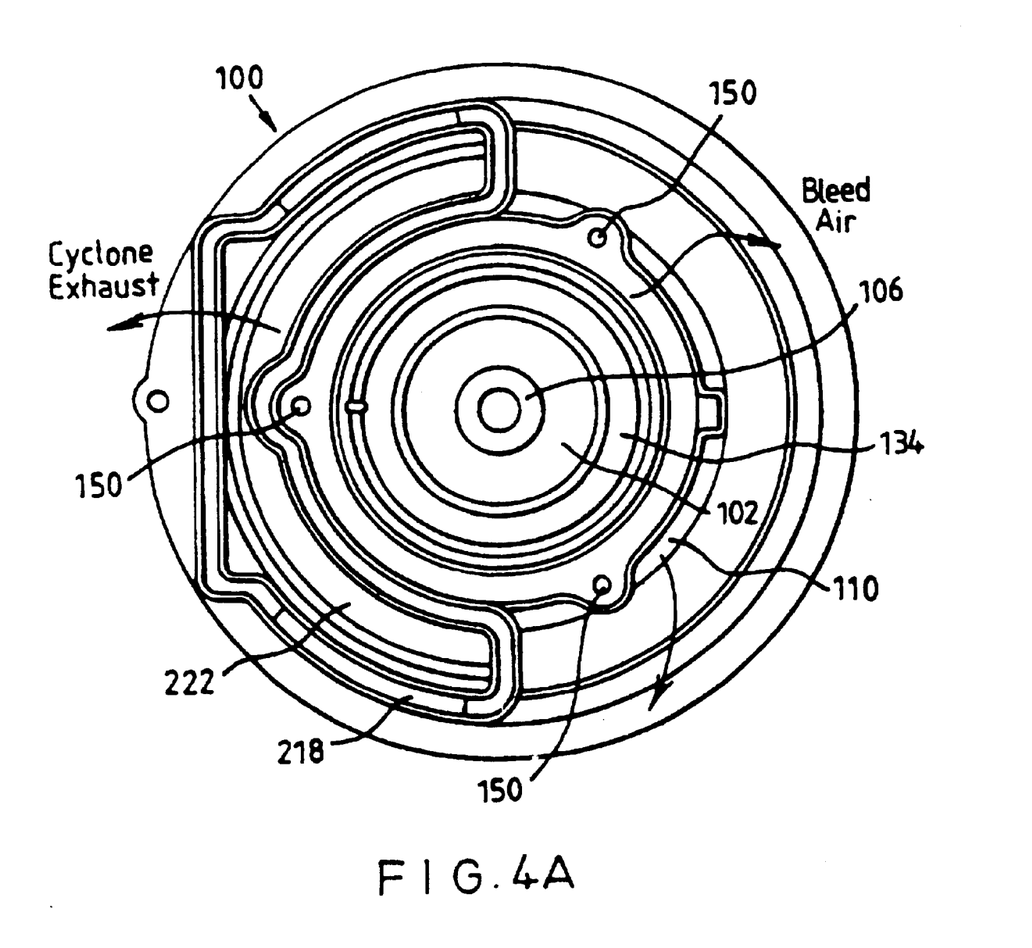
FIG. 4A is a plan view of the valve of FIG. 4 shown in situ.
Figure 4B:
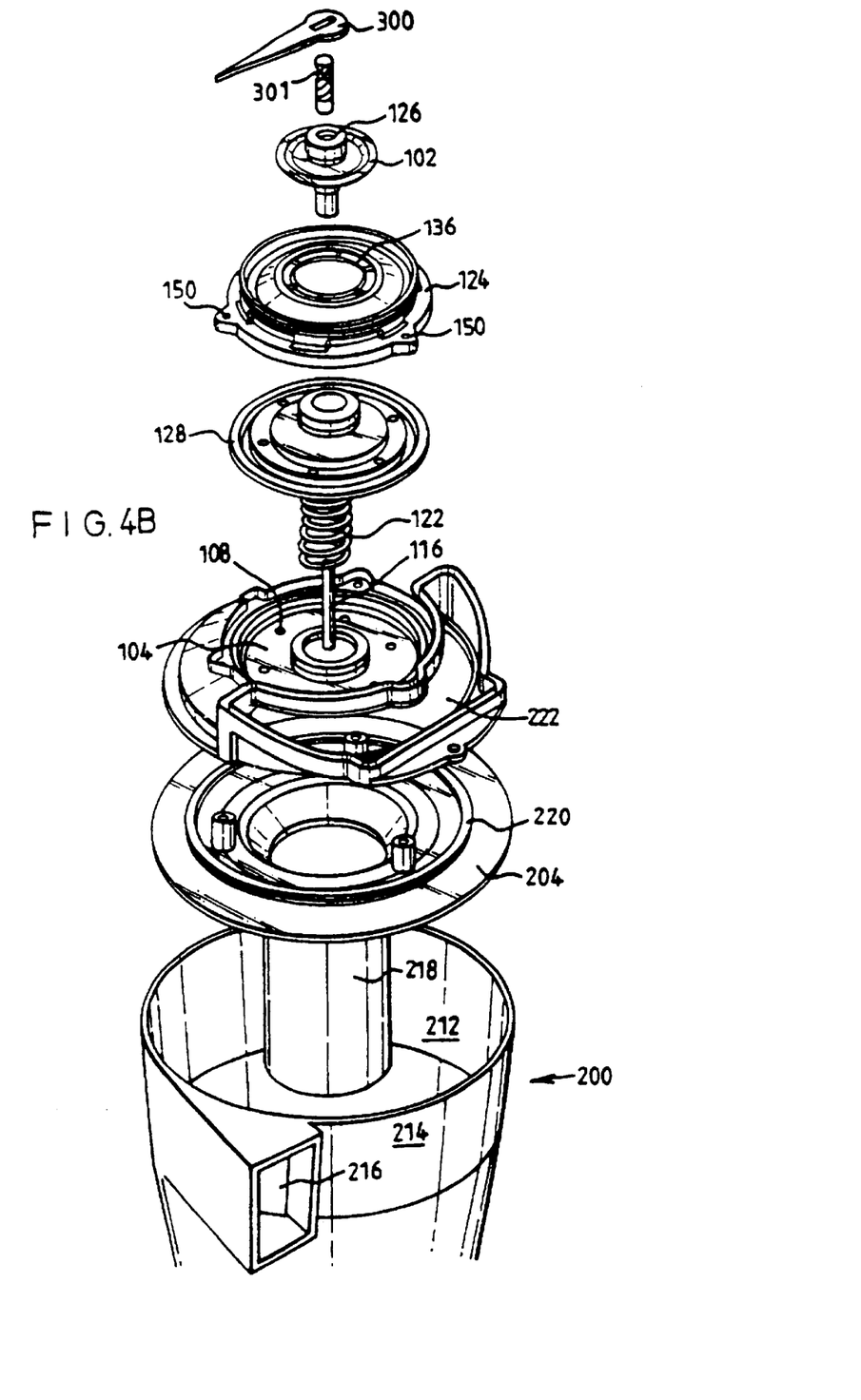
FIG. 4B is an exploded perspective view of the valve of FIG. 4.

FIGS. 4, 4A and 4B show an alternative bleed valve 100 with a head portion 102 in an open position with an airflow as shown by the arrows and as more fully described hereinafter for use in the apparatus of FIGS. 2 and 2A. The bleed valve 100 includes a housing 104 with a piston 124 held in place. The housing 104 includes ports 108 which are in airflow connection to a cyclone exhaust port 202 defined by walls 204 of the cleaner 200. The port 202 is thus in a downstream position. Second ports 110 are provided in the valve 100 which are in airflow connection to an upstream chamber 206 of the cleaner 200 defined by walls 208 and tubular extensions 210 which support and seal the bleed valve 100 in position. Air flows in a spiral manner into chamber 212 through chambers 214 and through a port 216 which forms an inlet into the inner cyclone 16B shown in FIG. 2A so as to be between the inner cyclone 16B and outer cyclone 16A. Walls 204 and 218 define chamber 212. Walls 218 and 207 define chamber 214.

The housing 104 of valve 100 defines a chamber 112 in which the piston 124 moves. A central portion 114 of the housing 104 supports a post or rod 116. The central portion 114 of the housing 104 is provided with a recess 118 which receives a seal retainer 120 for mounting a coil spring 122. Piston 124 includes the head portion 102 which is mounted on the main body of the piston 124 by means of a cap 126. The piston 124 is generally dish-shaped and extends toward the exhaust port 202. Seal 128 is mounted on the piston 124 and the housing 104 so as to provide a seal between the exhaust port 202 and a chamber 132 between the main body of the piston 124 and an upper portion 134 of the housing 104. Flow director vanes 136 are provided adjacent the head portion 102 of the valve 100 to keep the airflow from tending to close the valve 100. These are angled towards the ports 110.

The seal 128 is mounted at one side in a recess 138 in the housing 104 and is held in place by seal retainer 120. In the middle of the seal 128, a ring retainer 140 holds the seal 128 in position on the piston 124 by means of snaps 142. At the other side of the seal 128, the upper portions 134 and the housing 104 hold the seal in position in a recess 144. A recess 146 is also provided on the main body for the seal 128. Seal 148 is provided between tubular extensions 210 and the upper portion 134 of the piston 106. The valve 100 is held in place by retaining screws in openings 150 (FIG. 4A, 4B). FIG. 4 also shows the wall 218 of the outlet port 202 which returns to an opening 222 (FIG. 4A, 4B) adjacent the valve 100 and seal 220.

In operation, the head portion 102 of the piston 124 is open as shown in FIG. 4, when the cleaner motor 24 is not operating. In the normal air flow operating condition of the valve 100 when the motor is operating, the valve is closed. If a blockage occurs in the cleaner, thus restricting airflow, the valve 100 opens due to the reduced pressure differential between chambers 112 and 132, which allows the spring 122 to bias the piston 124 and head portion 102 into the open position shown in FIG. 4. The valve 100 is maintained in this position until the blockage is removed.

As shown in FIG. 4B, an indicator needle 300 is secured to a helix 301 and slidably mounted in retainer 106 on rod 116. As the head portion 102 moves on rod 116, a pin (not shown) in retainer 106 causes the needle 300 to rotate. This indicates the position of the valve.

The invention is not limited to the specific embodiments described above. Fundamentally, it is envisaged that the bleed valve could be incorporated into apparatus for separating particles from a flow of gas other than air or, possibly, a liquid. The apparatus has applications outside the vacuum cleaner industry and therefore the invention should not be regarded as limited to that industry. The bleed valve itself could also be applied across other apparatus and is therefore usable in other areas. Various alternative arrangements and other variations will be apparent to a reader skilled in the art.

What is claimed is:

1. A bleed valve for introducing bled fluid into a mainstream fluid flowing through an apparatus across which a fluid pressure differential occurs, comprising a movable member having a first side and a second side, means for applying an upstream fluid pressure to the first side and means for applying a downstream fluid pressure to the second side, and biasing means arranged to bear on the second side in addition to the downstream fluid pressure so that the movable member moves under the action of the biasing means to open the valve and introduce bled fluid into the mainstream fluid flow when the fluid pressure differential between the upstream and downstream fluid pressures drops below a predetermined value.

2. A bleed valve as claimed in claim 1, wherein the movable member is a piston.

3. A bleed valve as claimed in claim 1 further comprising means for adjusting the adjusting the force applied to the second side of the movable member by the biasing means in order to adjust the pressure differential at which bled fluid is bled into the mainstream fluid flow.

4. A bleed valve according to claim 1 wherein the movable member is rigidly connected to a vent closure so that movement of the movable member causes the vent to open and allow bled air to pass through the bleed valve and into the apparatus.

5. A bleed valve according to claim 1 wherein the bleed valve incorporates or is connected to indicator means for providing an indication of maintenance being required.

6. A bleed valve as claimed in according to claim 5, characterized in that wherein the indicator means comprises a switch means and a warning light.

7. Apparatus for carrying a mainstream fluid flow and across which a fluid pressure differential occurs when in use, the apparatus including a valve according to claim 1.

8. A bleed valve comprising:

a housing defining a bleed fluid aperture, an upstream fluid aperture and a downstream fluid aperture; a valve actuation member positioned within said housing between said upstream fluid aperture and said downstream fluid aperture;

a valve head connected to said valve actuation member; and a biasing element disposed between said housing and said valve actuation member; wherein said valve actuation member and said valve head are movable between a closed position in which said valve head closes said bleed fluid aperture, and an open position in which said valve head does not close said bleed fluid aperture, responsive to a fluid pressure differential between said upstream surface and said downstream surface.

9. A bleed valve according to claim 8 wherein said valve actuation member includes a flexible seal.

10. A bleed valve comprising:

a first housing section defining a first opening and a second opening;

a second housing section defining a third opening;

a flexible seal mounted between said first housing section and said second housing section and defining a first chamber and a second chamber, said first chamber in communication with said first and second openings, and said second chamber in communication with said third opening;

a valve actuation member connected to said flexible seal; and a first opening valve head connected to said valve actuation member; wherein said flexible seal, said valve actuation member and said valve head are movable between positions that open and close said first opening responsive to pressure differences between said first and said second chambers.

11. A bleed valve according to claim 10 further comprising a biasing element disposed against said valve actuation member to bias said valve actuation member and said first opening valve head into an open position when said pressure differences are below a predetermined value.

* * * * *